Patented Oct. 30, 1934

1,978,823

UNITED STATES PATENT OFFICE 1,978,823

PROCESS FOR THE PREPARATION OF ALUMINA POOR IN SILICIC ACID FROM ALKALINE EARTH ALUMINATES

Josef Stöhr, Waldshut, Germany

No Drawing. Application November 12, 1932, Serial No. 642,460. In Germany November 23, 1931

8 Claims. (Cl. 23—143)

This invention relates to the preparation of alumina.

According to known processes alumina is obtained from alkaline earth aluminates by extracting the latter with alkali carbonate solutions, preferably hot, e. g. soda solution, and the alumina is then precipitated from the liquor obtained after separating the undissolved portion, e. g. by leading in carbonic acid. A known disadvantage of this process which has been found to be very detrimental consists in that in the working up of alkaline earth aluminates containing silicic acid, as is nearly always the case in practice, the silicic acid present goes to a greater or less extent into solution and on the subsequent precipitation forms accordingly an impurity in the alumina and so renders necessary a special and troublesome after-purification treatment of the same.

To avoid this disadvantage it has been proposed to undertake the extraction of the alkaline earth aluminate with alkali carbonate solutions, to which a special addition of caustic alkali preferably in amounts of about 10% of the total alkali content has been made. This process is however only usable in some degree for quite definite, initial slags which are only met with in rare cases, namely those which have a quite definite calcium content, but does not otherwise lead to the desired results, and has moreover the drawback that besides the cheap soda, the relatively costly caustic alkali must be used.

It has now been found that it is possible to obtain by an extraordinarily simple process, at low cost, alumina very low in or free from silicic acid, from alkaline earth aluminate containing silicic acid, within the scope of the previously mentioned process of alkali carbonate extraction. This is brought about according to the invention by treating the starting material by an amount of alkali carbonate, e. g. soda, in excess of the easily replaceable lime contained in the alkaline earth aluminates, and thereupon, preferably after separation of the solid portions, adding caustic lime (calcium oxide or hydroxide) in definite amount whereupon, after causing the lime to react and separating the solid residue, the alumina is precipitated in known manner from the solution e. g. by introducing carbonic acid. The amount of added lime is to be chosen in such a manner that the following conditions are fulfilled:—

1. The amount of lime must be greater than that corresponding to the excess of undecomposed alkali carbonate, i. e. there must be an excess of free lime.

2. The excess of free lime over the alkali carbonate must be at least 12 times, preferably 25–30 times the amount of silicic acid present in dissolved form.

3. Per $M^3$ (cubic meter) of solution the excess of free lime over the alkali carbonate must not be less than 6 kg. CaO.

4. Per $M^3$ (cubic meter) of solution the excess of free lime over the alkali carbonate must not appreciably exceed 17.5 kg. CaO.

By maintaining these conditions it is possible to obtain an alumina extraordinarily low in, or practically free from silicic acid, as is obvious from the tabulated examples given below.

For the same the following three technical calcium aluminates were applied.

|  | I | II | III |
|---|---|---|---|
|  | Low in $SiO_2$ | Medium $SiO_2$ content | Rich in $SiO_2$ |
| $SiO_2$ | 2.28 | 3.76 | 8.16 |
| $TiO_2$ | 0.44 | 0.45 | 2.00 |
| $Fe_2O_3$ | 2.20 | 3.62 | 2.16 |
| $Al_2O_3$ | 58.36 | 61.73 | 54.60 |
| $CaO$ | 35.68 | 30.48 | 33.02 |

The method employed was as follows:—The calcium aluminate was extracted with 8 to 11% soda solution in a stirring apparatus at about 90° C. After an extraction period of 1½ hours lime in the form of lime paste was added and again stirred in ½–1 hour at 90° C. Thereupon it was filtered and from the sodium aluminate solution thus obtained, the alumina was precipitated by introducing carbonic acid.

Table 1

| | 1 | 2 | 3 | 4 | 5 | 6 |
|---|---|---|---|---|---|---|
| Calcium aluminate, No | II | II | II | I | III | I |
| Calcium aluminate, kg | 350 | 350 | 290 | 250 | 340 | 285 |
| Na₂CO₃, kg | 260 | 300 | 235 | 200 | 256 | 234 |
| Liquor, m³ | 2.6 | 2.6 | 2.5 | 2.7 | 2.7 | 2.4 |
| Dissolved Al₂O₃, kg | 109 | 175 | 153 | 109 | 151 | 151.5 |
| Dissolved Al₂O₃, percent | 51 | 81.5 | 88.5 | 75 | 81 | 91 |
| Na₂CO₃—excess, kg | 147 | 119 | 76 | 86.5 | 100 | 77 |
| Lime addition in kg. CaO | 80 | 80 | 80 | 70 | 80 | 70 |
| Lime excess in kg. CaO | 2.3 | 17 | 39.8 | 24.4 | 27 | 29.3 |
| The same per m³ of liquor, kg. CaO | 0.9 | 6.5 | 15.9 | 9.04 | 10.0 | 12.2 |
| The same per kg. of pptd. SiO₂, kg. CaO | 8.2 | 11.4 | 20.1 | 23.7 | 18.5 | 22.6 |
| SiO₂ dissolved per m³ liquor: | | | | | | |
| Before the lime treatment, kg | 0.60 | 0.68 | 0.84 | 0.48 | 0.79 | 0.61 |
| After the lime treatment, kg | 0.49 | 0.11 | 0.05 | 0.10 | 0.25 | 0.07 |
| SiO₂ content of the product, percent | 0.92 | 0.30 | 0.04 | 0.00 | 0.12 | 0.00 |

Table 2

| | 1 | 2 | 3 | 4 | 5 | 6 | 7 |
|---|---|---|---|---|---|---|---|
| Calcium aluminate No | II | I | I | II | I | II | III |
| Calcium aluminate kg | 350 | 287 | 280 | 260 | 250 | 335 | 340 |
| Na₂CO₃ kg | 260 | 238 | 228 | 247 | 200 | 266 | 256 |
| Liquor m³ | 2.6 | 2.4 | 2.4 | 2.7 | 2.7 | 2.6 | 2.7 |
| Dissolved Al₂O₃ kg | 109 | 105.3 | 113.8 | 125.3 | 109 | 167 | 151 |
| Dissolved Al₂O₃ percent | 51 | 63 | 70 | 88 | 75 | 81 | 81 |
| Na₂CO₃ excess kg | 147 | 129 | 110 | 117 | 86.5 | 93 | 100 |
| Lime addition in kg. CaO | 80 | 75 | 70 | 80 | 70 | 80 | 80 |
| Lime excess kg. CaO | 2.3 | 7 | 12 | 18 | 24.4 | 31 | 27 |
| The same per m³ liquor kg. CaO | 0.9 | 2.9 | 5 | 5.8 | 9.04 | 12 | 10 |
| The same per kg. of SiO₂ precipitated kg. CaO | 8.2 | 100 | | | 20.1 | 70.6 | 18.5 |
| SiO₂ dissolved per m³ liquor: | | | | | | | |
| Before lime treatment kg | 0.60 | 0.46x | 0.49x | 0.43x | 0.48 | 0.29 | 0.79 |
| After lime treatment kg | 0.49 | 0.42x | 0.52x | 0.45x | 0.10 | 0.12 | 0.25 |
| SiO₂ content of the product, percent | 0.92 | 0.16 | 0.24 | 0.16 | 0.00 | 0.12 | 0.12 | x Within the experimental error of the analysis.

Table 3

| | 1 | 2 | 3 | 4 | 5 | 6 | 7 | 8 | 9 | 10 |
|---|---|---|---|---|---|---|---|---|---|---|
| Calcium aluminate No | I | I | I | II | II | II | II | III | III | III |
| Calcium aluminate kg | 266 | 285 | 260 | 350 | 310 | 310 | 354 | 285 | 285 | 273 |
| Na₂CO₃ kg | 228 | 234 | 224 | 300 | 255 | 243 | 214 | 208 | 205 | 216 |
| Liquor m³ | 2.6 | 2.4 | 2.4 | 2.6 | 2.6 | 2.6 | 2.4 | 2.5 | 2.5 | 2.4 |
| Dissolved Al₂O₃ kg | 117 | 151.5 | 142.4 | 175 | 168 | 167 | 150 | 108.5 | 95 | 142 |
| Dissolved Al₂O₃ percent | 75 | 91 | 99 | 81.5 | 88 | 87.5 | 77 | 69.5 | 60.9 | 95.5 |
| Na₂CO₃ excess | 106 | 77 | 76 | 119 | 81 | 70 | 58 | 96 | 106.5 | 69 |
| Lime addition kg. CaO | 70 | 70 | 90 | 80 | 80 | 80 | 80 | 80 | 100 | 80 |
| Lime excess kg. CaO | 14 | 29.3 | 50 | 17 | 37.3 | 43 | 49 | 29.3 | 43.8 | 43.5 |
| Lime excess per m³ liquor kg. CaO | 5.4 | 12.2 | 20 | 6.5 | 14.3 | 16.5 | 20.4 | 11.7 | 17.5 | 18 |
| Diminution in Al₂O₃ yield by CaO percent | 0.0 | 0.0 | 25 | 0.0 | 0.0 | 0.0 | 15 | 0.0 | 3 | 18 |
| SiO₂ content of product percent | 0.08 | 0.00 | 0.00 | 0.30 | 0.08 | 0.00 | 0.08 | 0.44 | 0.38 | 0.06 |

Table 1 shows that for obtaining satisfactory results condition 2 must be fulfilled i. e. that the excess of free lime over the alkali carbonate must be at least 12 times the amount of the dissolved silicic acid. Table 2 correspondingly shows the necessity of fulfilment of the above condition 3 and table 3 that of above condition 4.

Table 3 shows further that with starting materials specially rich in silicic acid either the limit of 17.5 kg. CaO per M³ of liquor must be somewhat exceeded and therefore certain losses in the alumina yield must be expected, if it is desired to obtain alumina as free as possible from silicic acid, or that a certain more or less small silicic acid content cannot be avoided, if it is desired to work so as to obtain the highest possible yield of alumina. With this exception, it is however possible within the scope of the above process by maintaining the above named conditions to obtain alumina practically free from, or extraordinarily low in silicic acid without loss of yield.

In certain cases, namely,—if the silicic acid content of the solution to be precipitated measures less than about 0.36 kg. SiO₂ per M³ of solution the lime addition does not turn out so satisfactory as in all other cases, i. e. the silicic acid content of the solution is not so extensively altered as in the cases in which solutions richer in silicic acid are treated. This phenomenon, which must be attributed to the solubility of calcium silicate, is however without influence on the silicic acid content of the precipitated alumina, i. e. in such cases also, an extraordinarily alumina low in or practically free from silicic acid can be obtained. With regard to this point the examples given in the following table give more information.

| | 1 | 2 | 3 | 4 |
|---|---|---|---|---|
| Calcium aluminate No | I | II | I | III |
| Calcium aluminate, kg | 335 | 290 | 250 | 290 |
| Na₂CO₃, kg | 266 | 240 | 200 | 254 |
| Liquor, m³ | 2.6 | 2.6 | 2.7 | 2.6 |
| Dissolved Al₂O₃, kg | 167 | 130.9 | 109 | 134.6 |
| Dissolved Al₂O₃, percent | 81 | 73 | 75 | 75 |
| Na₂CO₃ excess, kg | 93 | 104 | 86.5 | 114.5 |
| Lime addition, kg. CaO | 80 | 80 | 70 | 80 |
| Lime excess, kg. CaO | 31 | 25 | 24.4 | 19.4 |
| The same per m³ of liquor, kg. CaO | 12 | 9.62 | 9.04 | 7.5 |
| The same per kg. of SiO₂ precipitated, kg. CaO | 70.6 | 48.1 | 23.7 | 15.9 |
| SiO₂ dissolved, per m³ liquor: | | | | |
| Before lime treatment, kg | 0.29 | 0.33 | 0.48 | 0.49 |
| After lime treatment, kg | 0.12 | 0.31 | 0.10 | 0.02 |
| SiO₂ content of product, percent | 0.12 | 0.14 | 0.00 | 0.08 |

If in the latter cases, a solution as free as possible from silicic acid is to be worked up, this may be rendered possible by first increasing the silicic acid content of the solutions to at least about 0.35 kg. per m³ of SiO₂ by addition by soluble silicic acid which may be added, e. g. as sodium silicate, in solid or dissolved form.

There is obtained in this manner, by the action of the lime, solutions of which the SiO₂ content is extraordinarily low, e. g. about 0.02 kg. per m³.

In some cases, the above mentioned process can also be carried out in such a manner that the extraction of the alkaline earth aluminate by means of alkali carbonate, is undertaken in presence of the lime, the lime being added already to the alkali carbonate intended for the extraction or to the alkaline earth aluminate, and the further working up being performed in a similar manner. In general however the stepwise method of working previously mentioned is to be preferred.

I claim:—

1. In the process of producing alumina poor in silica acid from alkaline earth aluminates by extracting the same with alkali carbonate solutions and fixing the silicic acid with lime followed by the precipitation of alumina, that improvement which comprises first extracting alkaline earth aluminates with an amount of alkali carbonate in excess over the amount of easily replaceable lime contained in the alkaline earth aluminates, thereupon adding lime to the mass in an amount which is greater than that corresponding to the residual non-decomposed alkali carbonate, the excess of said lime over said alkali carbonate being at least 12 times the amount of the dissolved silicic acid and not less than about 6 kilograms CaO per cubic meter of liquor nor more than 17.5 kilograms of CaO per cubic meter of liquor, permitting said lime to act in said liquor, separating the solids from the solution after the action of the lime, and finally precipitating the alumina from the solution.

2. In the process of producing alumina poor in silicic acid from alkaline earth aluminates by extracting the same with alkali carbonate solutions and fixing the silicic acid with lime followed by the precipitation of alumina, that improvement which comprises first extracting alkaline earth aluminates with an amount of alkali carbonate in excess over the amount of easily replaceable lime contained in the alkaline earth aluminates, thereupon adding lime to the mass in an amount which is greater than that corresponding to the residual non-decomposed alkali carbonate, the excess of said lime over said alkali carbonate being about 25 to 30 times the amount of the dissolved silicic acid and not less than about 6 kilograms CaO per cubic meter of liquor nor more than 17.5 kilograms of CaO per cubic meter of liquor, permitting said lime to act in said liquor, separating the solids from the solution after the action of the lime, and finally precipitating the alumina from the solution.

3. In the process of producing alumina poor in silicic acid from alkaline earth aluminates by extracting the same with alkali carbonate solutions and fixing the silicic acid with lime followed by the precipitation of alumina, that improvement which comprises first extracting alkaline earth aluminates with an amount of alkali carbonate in excess over the amount of easily replaceable lime contained in the alkaline earth aluminates, increasing the content of silicic acid in the solution to at least about 0.35 kilograms per cubic meter of SiO₂ by the addition of soluble silicic acid, thereupon adding lime to the mass in an amount which is greater than that corresponding to the residual non-decomposed alkali carbonate, the excess of said lime over said alkali carbonate being at least 12 times the amount of the dissolved silicic acid and not less than about 6 kilograms CaO per cubic meter of liquor nor more than 17.5 kilograms of CaO per cubic meter of liquor, permitting said lime to act in said liquor, separating the solids from the solution after the action of the lime, and finally precipitating the alumina from the solution.

4. In the process of producing alumina poor in silicic acid from alkaline earth aluminates by extracting the same with alkali carbonate solutions and fixing the silicic acid with lime followed by the precipitation of alumina, that improvement which comprises first extracting alkaline earth aluminates with an amount of alkali carbonate in excess over the amount of easily replaceable lime contained in the alkaline earth aluminates, increasing the content of silicic acid in the solution to at least about 0.35 kilograms per cubic meter of SiO₂ by the addition of soluble silicic acid, thereupon adding lime to the mass in an amount which is greater than that corresponding to the residual non-decomposed alkali carbonate, the excess of said lime over said alkali carbonate being about 25 to about 30 times the amount of the dissolved silicic acid and not less than about 6 kilograms CaO per cubic meter of liquor nor more than 17.5 kilograms of CaO per cubic meter of liquor, permitting said lime to act in said liquor, separating the solids from the solution after the action of the lime, and finally precipitating the alumina from the solution.

5. In the process of producing alumina poor in silicic acid from alkaline earth aluminates by extracting the same with alkali carbonate solutions and fixing the silicic acid with lime followed by the precipitation of alumina, that improvement which comprises first extracting alkaline earth aluminates with an amount of alkali carbonate in excess over the amount of easily replaceable lime contained in the alkaline earth aluminates, separating the solids therefrom, increasing the content of silicic acid in the solution to at least 0.35 kilograms per cubic meter of SiO₂ by the addition of soluble silicic acid, thereupon adding lime to the mass in an amount which is greater than that corresponding to the residual non-decomposed alkali carbonate, the excess of said lime over said alkali carbonate being at least 12 times the amount of the dissolved silicic acid and not less than about 6 kilograms CaO per cubic meter of liquor nor more than 17.5 kilograms of CaO per cubic meter of liquor, permitting said lime to act in said liquor, separating the solids from the solution after the action of the lime, and finally precipitating the alumina from the solution.

6. In the process of producing alumina poor in silicic acid from alkaline earth aluminates by extracting the same with alkali carbonate solutions and fixing the silicic acid with lime followed by the precipitation of alumina, that improvement whch comprises first extracting alkaline earth aluminates with an amount of alkali carbonate in excess over the amount of easily replaceable lime contained in the alkaline earth aluminates, separating the solids therefrom, increasing the content of silicic acid in the solution to at least 0.35 kilograms per cubic meter of SiO₂ by the addition of soluble silicic acid, thereupon adding lime to the mass in an amount which is greater than that correspondng to the residual non-decomposed alkali carbonate, the excess of said lime over said alkali carbonate being about 25 to about 30 times the amount of the dissolved silicic acid and not less than about 6 nor more than 17.5 kilograms of CaO per cubic meter of liquor, permitting said lime to act in said liquor, separating the solids from the solution after the action of the lime, and finally precipitating the alumina from the solution.

7. In the process of producing alumina poor in silicic acid from alkaline earth aluminates by extracting the same with alkali carbonate solutions and fixing the silicic acid with lime followed by the precipitation of alumina, that improvement which comprises first extracting alkaline earth aluminates with an amount of alkali carbonate in excess over the amount of easily replaceable lime contained in the alkaline earth aluminates, thereupon adding lime to the mass in an amount which is greater than that corresponding to the residual non-decomposed alkali carbonate, the excess of said lime over said alkali carbonate being at least 12 times the amount of the dissolved silicic acid and not less than about 6 kilograms CaO per cubic meter of liquor nor more than 17.5 kilograms of CaO per cubic meter of liquor, increasing the content of silicic acid in the solution to at least 0.35 kilograms per cubic meter of $SiO_2$ by adding soluble silicates, separating the solids from the solution after the action of the lime, and finally precipitating the alumina from the solution.

8. In the process of producing alumina poor in silicic acid from alkaline earth aluminates by extracting the same with alkali carbonate solutions and fixing the silicic acid with lime followed by the precipitation of alumina, that improvement which comprises first extracting alkaline earth aluminates with an amount of alkali carbonate in excess over the amount of easily replaceable lime contained in the alkaline earth aluminates, thereupon adding lime to the mass in an amount which is greater than that corresponding to the residual non-decomposed alkali carbonate, the excess of said lime over said alkali carbonate being about 25 to about 30 times the amount of the dissolved silicic acid and not less than about 6 kilograms CaO per cubic meter of liquor nor more than 17.5 kilograms of CaO per cubic meter of liquor, increasing the content of silicic acid in the solution to at least 0.35 kilograms per cubic meter of $SiO_2$ by adding soluble silicates, separating the solids from the solution after the action of the lime, and finally precipitating the alumina from the solution.

JOSEF STÖHR.